United States Patent
Nilsson et al.

(10) Patent No.: US 9,740,938 B2
(45) Date of Patent: *Aug. 22, 2017

(54) EYE GAZE CORRECTION

(71) Applicant: Microsoft Technology Licensing, LLC, Redmond, WA (US)

(72) Inventors: Mattias Nilsson, Sundbyberg (SE); Sam Johnson, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/792,324

(22) Filed: Jul. 6, 2015

(65) Prior Publication Data

US 2016/0323540 A1  Nov. 3, 2016

(51) Int. Cl.
| | |
|---|---|
| *H04N 7/14* | (2006.01) |
| *G06K 9/00* | (2006.01) |
| *G06K 9/52* | (2006.01) |
| *G06T 7/60* | (2017.01) |
| *G06T 7/73* | (2017.01) |
| *G06T 7/246* | (2017.01) |
| *G06K 9/46* | (2006.01) |

(52) U.S. Cl.
CPC ....... *G06K 9/00744* (2013.01); *G06K 9/0061* (2013.01); *G06K 9/00281* (2013.01); *G06K 9/52* (2013.01); *G06T 7/246* (2017.01); *G06T 7/60* (2013.01); *G06T 7/73* (2017.01); *H04N 7/144* (2013.01); *H04N 7/147* (2013.01); *G06K 2009/4666* (2013.01); *G06T 2207/30201* (2013.01)

(58) Field of Classification Search
CPC combination set(s) only.
See application file for complete search history.

(56) References Cited

U.S. PATENT DOCUMENTS

| | | | |
|---|---|---|---|
| 5,333,029 | A | 7/1994 | Uchiyama et al. |
| 6,578,962 | B1 | 6/2003 | Amir et al. |
| | | (Continued) | |

FOREIGN PATENT DOCUMENTS

| | | |
|---|---|---|
| CA | 2435873 | 3/2004 |
| CN | 103345619 | 10/2013 |
| | (Continued) | |

OTHER PUBLICATIONS

Beymer,"Eye Gaze Tracking Using an Active Stereo Head", In Proceedings of the IEEE Computer Society Conference on Computer Vision and Pattern Recognition, vol. 2, Jun. 18, 2003, 8 pages.

(Continued)

*Primary Examiner* — Joseph J Nguyen

(57) ABSTRACT

A user's eye gaze is corrected in a video of the user's face. A facial tracking module is configured, in an active tracking mode, to track at least one angular coordinate of the user's face and to output a current value of the at least one angular coordinated that is within a range of possible values. Frames of the video are modified to correct the eye gaze of the user, whereby the user is perceived to be looking directly at the camera in the modified frames, only when the tracking module is in the active tracking mode and the current value is within a restricted subrange of the range of possible values for which the user's face is oriented towards the camera.

20 Claims, 7 Drawing Sheets

(56) References Cited

U.S. PATENT DOCUMENTS

| | | | |
|---|---|---|---|
| 6,659,611 | B2 | 12/2003 | Amir et al. |
| 6,771,303 | B2 | 8/2004 | Zhang et al. |
| 6,806,898 | B1 | 10/2004 | Toyama et al. |
| 7,043,056 | B2 | 5/2006 | Edwards et al. |
| 7,542,210 | B2 | 6/2009 | Chirieleison, Sr. |
| 7,686,451 | B2 | 3/2010 | Cleveland |
| 8,077,914 | B1 | 12/2011 | Kaplan |
| 8,670,019 | B2 | 3/2014 | Byers |
| 9,344,673 | B1 | 5/2016 | Buchheit et al. |
| 2002/0012454 | A1 | 1/2002 | Liu et al. |
| 2003/0197779 | A1 | 10/2003 | Zhang et al. |
| 2012/0051597 | A1 | 3/2012 | Fogt |
| 2012/0133754 | A1* | 5/2012 | Lee .................. G06F 3/013 348/78 |
| 2012/0290401 | A1 | 11/2012 | Nevan |
| 2013/0070046 | A1 | 3/2013 | Wolf et al. |
| 2013/0201359 | A1 | 8/2013 | Wu et al. |
| 2014/0002586 | A1 | 1/2014 | Nourbakhsh |
| 2014/0016871 | A1 | 1/2014 | Son et al. |
| 2015/0309569 | A1 | 10/2015 | Kohlhoff et al. |
| 2016/0004303 | A1* | 1/2016 | Arar .................. G06F 3/013 345/156 |
| 2016/0323541 | A1 | 11/2016 | Nilsson et al. |

FOREIGN PATENT DOCUMENTS

| | | |
|---|---|---|
| EP | 2634727 | 9/2013 |
| WO | WO-2011030263 | 3/2011 |
| WO | WO-2011148366 | 12/2011 |

OTHER PUBLICATIONS

Davis,"The Representation and Recognition of Action Using Temporal Templates", Proceedings of IEEE Computer Society Conference on Computer Vision and Pattern Recognition, Jun. 17, 1997, 7 pages.

Gemmell,"Gaze Awareness for Video-conferencing: A Software Approach", MultiMedia, IEEE (vol. 7 , Issue: 4), Oct. 2000, 10 pages.

Giger,"Gaze Correction with a Single Webcam", IEEE International Conference on Multimedia and Expo (ICME), Jul. 14, 2014, 6 pages.

Grauman,"Communication via Eye Blinks—Detection and Duration Analysis in Real Time", Proceedings of the 2001 IEEE Computer Society Conference on Computer Vision and Pattern Recognition (vol. 1), Dec. 2001, 8 pages.

Hennessey,"A Single Camera Eye-Gaze Tracking System with Free Head Motion", In Proceedings of the Symposium on Eye tracking Research & Applications, Mar. 27, 2006, 8 pages.

Kuster,"Gaze Correction for Home Video Conferencing", Proceedings of ACM Asia ACM Transactions on Graphics (TOG); vol. 31 Issue 6, Nov. 2012, Article No. 17, Nov. 2012, 6 pages.

Smith,"Gaze Locking: Passive Eye Contact Detection for Human-Object Interaction", In Proceedings of the 26th Annual ACM Symposium on User Interface Software and Technology, Oct. 8, 2013, 10 pages.

Williams,"Progress on Stabilizing and Controlling Powered Upper-Limb Prostheses", In Proceedings: Journal of Rehabilitation Research and Development, vol. 48, No. 6 Retrieved From: <http://www.rehab.research.va.gov/jour/11/486/williams486.html> Feb. 9, 2015, Mar. 5, 2013, 7 pages.

Wolf,"An Eye for an Eye: A Single Camera Gaze-Replacement Method", In Proceedings of IEEE Conference on Computer Vision and Pattern Recognition, Jun. 13, 2010, 8 pages.

Yang,"Eye Gaze Correction with Stereovision for Video-Teleconferencing", Microsoft Research, Technical Report, MSR-TR-2001-119, Dec. 2001, 15 pages.

Yang,"Model-based Head Pose Tracking with Stereovision", In Proceedings: In Technical Report MSR-TR Available at: <http://research-srv.microsoft.com/en-us/um/people/zhang/Papers/TR01-102.pdf>, Oct. 2001, 12 pages.

Yang,"Real-time Face and Facial Feature Tracking and Applications", In Proceedings of International Conference on Auditory-Visual Speech Processing Available at: <http://citeseerx.ist.psu.edu/viewdoc/download?doi=10.1.1.29.6453&rep=rep1&type=pdf>, Dec. 4, 1998, 6 pages.

Yip,"An effective eye gaze correction operation for video conference using antirotation formulas", Proceedings of the 2003 Joint Conference of the Fourth International Conference on Information, Communications and Signal Processing, 2003 and Fourth Pacific Rim Conference on Multimedia., Dec. 15, 2003, 5 pages.

"International Search Report and Written Opinion", Application No. PCT/US2016/029401, Jul. 28, 2016, 12 pages.

"International Search Report and Written Opinion", Application No. PCT/US2016/029400, Aug. 8, 2016, 13 pages.

"Non-Final Office Action", U.S. Appl. No. 14/792,327, Jul. 8, 2016, 19 pages.

"Final Office Action", U.S. Appl. No. 14/792,237, dated Feb. 3, 2017, 9 pages.

"International Preliminary Report on Patentability", Application No. PCT/US2016/029401, dated Apr. 7, 2017, 7 pages.

"Notice of Allowance", U.S. Appl. No. No. 14/792,327, dated Apr. 26, 2017, 5 pages.

"Second Written Opinion", Application No. PCT/US2016/029400, dated Apr. 5, 2017, 5 pages.

\* cited by examiner

US 9,740,938 B2

EYE GAZE CORRECTION

RELATED APPLICATION

This application claims priority under 35 USC 119 or 365 to Great Britain Application No. 1507224.2 filed Apr. 28, 2015, the disclosure of which is incorporated in its entirety.

BACKGROUND

Conventional communication systems allow the user of a device, such as a personal computer or mobile device, to conduct voice or video calls over a packet-based computer network such as the Internet. Such communication systems include voice or video over internet protocol (VoIP) systems. These systems are beneficial to the user as they are often of significantly lower cost than conventional fixed line or mobile cellular networks. This may particularly be the case for long-distance communication. To use a VoIP system, the user installs and executes client software on their device. The client software sets up the VoIP connections as well as providing other functions such as registration and user authentication. In addition to voice communication, the client may also set up connections for other communication media such as instant messaging ("IM"), SMS messaging, file transfer, screen sharing, whiteboard sessions and voicemail.

A user device equipped with a camera and a display may be used to conduct a video call with another user(s) of another user device(s) (far-end user(s)). Video of a user of the user device (near-end user) is captured via their camera. The video may be processed by their client to, among other things, compress it and covert it to a data stream format for transmission via the network to the far end user(s). A similarly compressed video stream may be received from (each of) the far-end user(s), decompressed and outputted on the display of the near-end user's device. A video stream may for example be transmitted via one or more video relay servers, or it may be transmitted "directly" e.g. via a peer-to-peer connection. The two approaches may be combined so that one or more streams of a call are transmitted via server(s) and one or more other streams of the call are transmitted directly.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A user device for correcting an eye gaze of a user comprises an input configured to receive from a camera video of the user's face, a facial tracking module, and an eye gaze correction module. The facial tracking module is configured, in an active tracking mode, to track at least one angular coordinate of the user's face and to output a current value of the at least one angular coordinated that is within a range of possible values. The eye gaze correction module is configured to modify frames of the video to correct the eye gaze of the user, whereby the user is perceived to be looking directly at the camera in the modified frames, only when the tracking module is in the active tracking mode and the current value is within a restricted subrange of the range of possible values for which the user's face is oriented towards the camera.

BRIEF DESCRIPTION OF FIGURES

To aid understanding of the subject matter and to show how the same may be carried into effect, reference will now be made to the following figures in which.

DETAILED DESCRIPTION OF EMBODIMENTS

Eye contact is a key aspect of in-person conversation between humans in the real-world. Various psychological studies have demonstrated that people are more likely to engage with one another during interpersonal communication when they are able to make eye contact. However, during a video call, call participants generally spend much of the call looking at their displays as that is where the video of the other participant(s) is visible. This means that for much of the call they will not be looking directly at their cameras, and thus will perceived by the other participant(s) to be not making eye contact with them. For example, if a participant's camera is located above their display, they will be perceived as gazing at a point below the other participant(s) eyes.

Aspects of this disclosure relate to modifying video of a user's face so that they are perceived to be looking directly the camera in the modified video. This is referred to as correcting an eye gaze of the user. The video is modified to replace the user's eyes as they appear therein with those of a pre-recorded image of their eyes that have the desired eye gaze. Another person viewing the modified video will thus perceive the user to be making eye contact with them. In the context of a video call, the perceived eye contact encourages the call participants to better engage with one another.

Eye gaze correction is known, but existing eye gaze correction systems are prone to visual artefacts that look artificial and inhuman. Various techniques are provided herein which provide natural-looking eye gaze correction, free from such artefacts. When implemented in a video call context, the techniques presented herein thus facilitate a more natural conversation experience than could be achieved with existing eye gaze correction systems.

Figure 1:
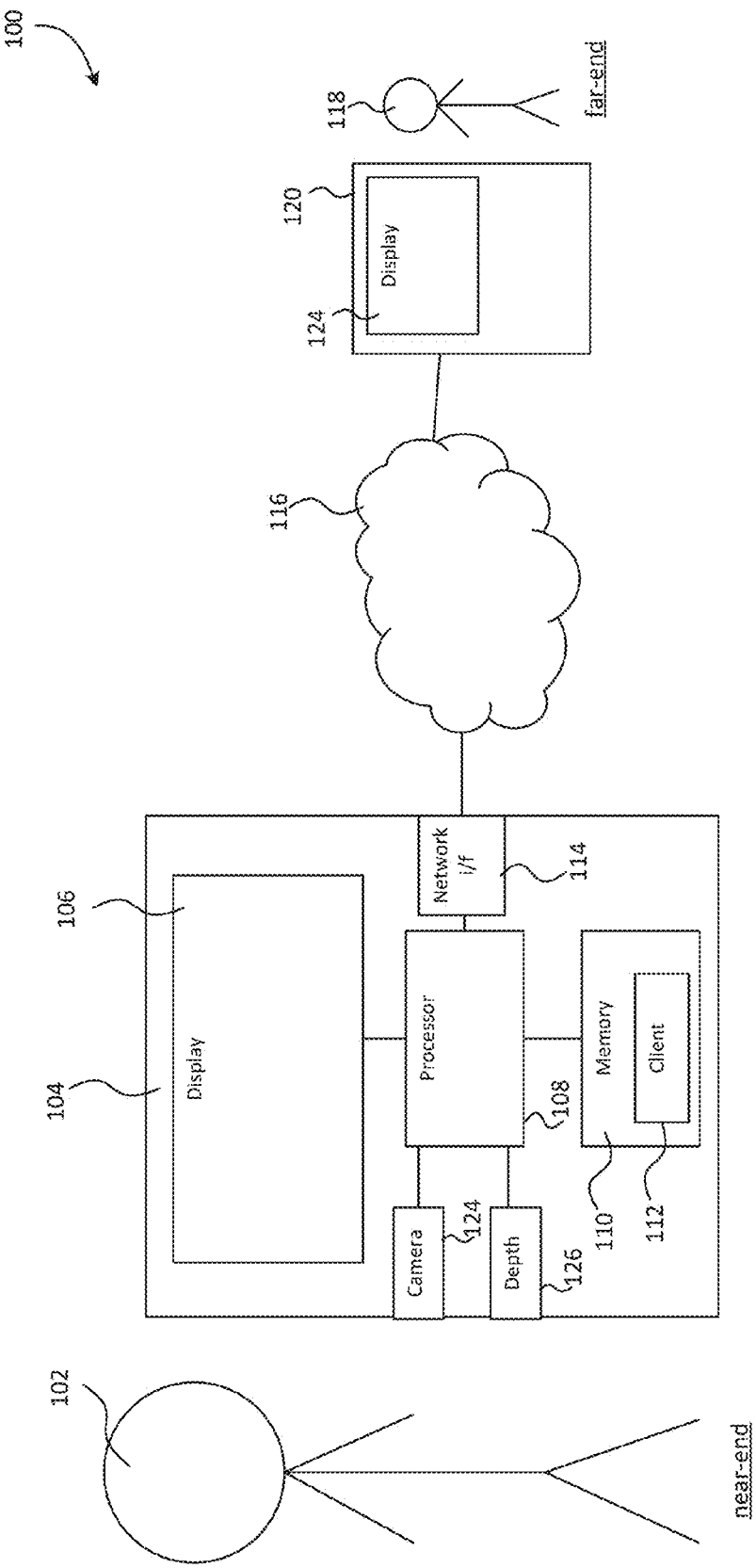
FIG. 1 shows a schematic block diagram of communication system.

FIG. 1 shows a communication system 100, which comprises a network 116, a user device 104 accessible to a user 102 (near-end user), and another user device 120 accessible to another user 118 (far-end user). The user device 104 and other user device 120 are connected to the network 116. The network 116 is a packet-based network such as the Internet.

The user device 104 comprises a processor 108, e.g. formed of one or more CPUs (Central Processing Units) and/or one or more GPUs (Graphics Processing Units), to which is connected a network interface 114—via which the user device 104 is connected to the network 116—computer storage in the form of a memory 110, a display 106 in the form of a screen, a camera 124 and (in some embodiments) a depth sensor 126. The user device 104 is a computer which can take a number of forms e.g. that of a desktop or laptop computer device, mobile phone (e.g. smartphone), tablet computing device, wearable computing device, television (e.g. smart TV), set-top box, gaming console etc. The camera 124 and depth sensor 126 may be integrated in the user device 104, or they may external components. For example, they may be integrated in an external device such as an Xbox (R) Kinect (R) device. The camera captures video as a series of frames F, which are in an uncompressed RGB (Red Green Blue) format in this example though other formats are envisaged and will be apparent.

The camera has a field of view, which is a solid angle through which light is receivable by its image capture component. The camera 124 is in the vicinity of the display. For instance it may be located near an edge of the display e.g. at the top or bottom or to one side of the display. The camera 124 has an image capture component that faces outwardly of the display. That is, the camera 124 is located relative to the display so that when the user 102 is in front of and looking at the display, the camera 126 captures a frontal view of the user's face. The camera may for example be embodied in a webcam attachable to the display, or it may be a front-facing camera integrated in the same device as the display (e.g. smartphone, tablet or external display screen). Alternatively the camera and display may be integrated in separate devices. For example, the camera may be integrated in a laptop computer and the display may be integrated in a separate external display (e.g. television screen).

Among other things the memory 110 holds software, in particular a communication client 112. The client 112 enables a real-time video (e.g. VoIP) call to be established between the user device 104 and the other user device 120 via the network 116 so that the user 102 and the other user 118 can communicate with one another via the network 116. The client 112 may for example be a stand-alone communication client application formed of executable code, or it may be plugin to another application executed on the processor 108 such as a Web browser that is run as part of the other application.

The client 112 provides a user interface (UI) for receiving information from and outputting information to the user 102, such as visual information displayed via the display 106 (e.g. as video) and/or captured via the camera 124. The display 104 may comprise a touchscreen so that it functions as both an input and an output device, and may or may not be integrated in the user device 104. For example the display 106 may be part of an external device, such as a headset, smartwatch etc., connectible to the user device 104 via suitable interface.

The user interface may comprise, for example, a Graphical User Interface (GUI) via which information is outputted on the display 106 and/or a Natural User Interface (NUI) which enables the user to interact with the user device 104 in a natural manner, free from artificial constraints imposed by certain input devices such as mice, keyboards, remote controls, and the like. Examples of NUI methods include those utilizing touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems etc.

Figure 2:
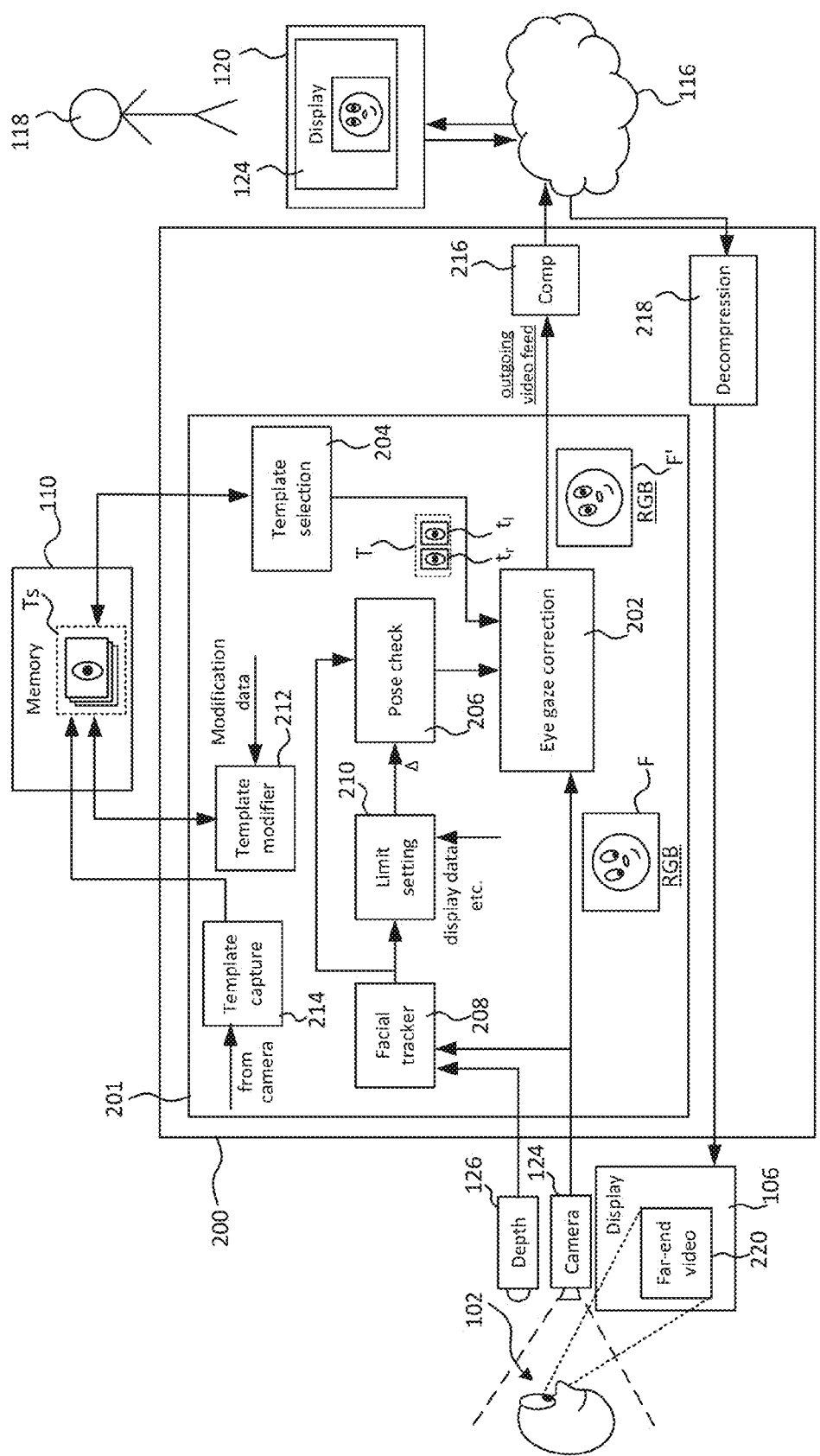
FIG. 2 shows functional modules of a communication client.

FIG. 2 shows a video calling system 200 for effecting a video call between the user 112 and at least the other user 118. The video calling system comprises various functional modules, which are software modules representing functionality implemented by running the client software 112 on the processor 108. In particular, the system 200 comprises the following functional modules: an eye gaze correction module 202, a template selection module 204, a pose check module 206, a facial tracker 208, a limit setting module 210, a template modifier 212, and a template capture module 214. The modules 202-214 constitute a video gaze correction system 201. In addition, the video call system 200 comprises a video compressor 216 and a video decompressor 218. The video gaze correction system 201 has input by which it receives video from the camera 124 and sensor data from the depth sensor 126.

Far-end video 220 is received via the network 116 from the other user device 120 as an incoming video stream of compressed video frames, which are decompressed by the decompressor 218 and displayed on the display 106.

Video to be transmitted to the far-end device 102 (near-end video) is received (locally) by the gaze correction system 201 from the camera 124 and modified at the near-end device to correct the user's eye gaze before transmission. The user is unlikely to be looking directly at the camera 124 in the received video as they are more likely to be looking at the display 106 on which the far-end video 220 of the other user 118 is being displayed. The eye gaze correction module 202 modifies the (locally) received video to replace the eyes of the user 102 with an image of eyes looking at the camera. The replacement eye images come from "templates" Ts, which are stored in the memory 110. The facial tracker 208 tracks the user's face, and the modification of the received video by the eye replacement module 202 is based on the tracking of the user's face by the facial tracker 208. In particular, the tracking of the user's face by the facial tracker 208 indicates a location(s) corresponding to the user's eyes in a to-be modified frame and a replacement eye image(s) is inserted at a matching location(s).

The modification is selective i.e. frames of the received video are modified when and only when eye gaze correction is considered appropriate. Further details of the conditions under which modification is considered appropriate are given below.

The selectively modified video is outputted by the gaze correction system 201 as an outgoing video feed. Because the modification is selective, the outgoing video feed may at times be formed of modified frames (labelled F'), i.e. with replacement eye images inserted in them, and at other times unmodified frames (labelled F), i.e. substantially as received from the camera 124.

The outgoing video feed is supplied to the compressor 216, which compresses it e.g. using a combination of inter and intra frame compression. The compressed video is transmitted to the far-end user device 120 as an outgoing video stream via the network 116. The video is selectively modified and transmitted in real-time i.e. so that there is only a short interval (e.g. about 2 seconds or less) between each frame being captured by the camera 126 and arriving at the far-end device 120. Any modification of that frame by the gaze correction system 202 takes place within that short interval. The users 102, 118 can therefore conduct a video conversation in real-time.

Template Capture

Each of the stored templates Ts comprises a different image of an eye of the user eyes looking directly at the camera. The differences may be slight but they are nonetheless visually perceptible. These direct camera gaze eye templates are gathered and stored in memory 110, for example in a template database, by the template capture module 214. The capture process can be a "manual" process i.e. in which the user is asked to look directly at the camera, or automatic using a gaze estimation system. In the embodiments described herein, the templates Ts are parts of individual frames (template frames) of a template video that was captured with the camera 124 when the user was looking directly at it, and each template comprises an image of only a single eye (left or right). That is, the templates Ts are from temporally consecutive frames of the template video. The template video is short, e.g. having a duration of about 1 to 2 seconds. During this time, the user's eyes may exhibit one or more saccades. A saccade in this context is a very rapid, simultaneous movement between two (temporal) phases of fixation, in which the eyes are fixated on the camera 124. That is, a saccade is a very rapid movement away from then back to the camera 124. Note that the user is considered to be looking directly at the camera both during such phases of fixation and throughout any intervening saccades.

In the following a "patch" means a live frame or template or a part of a live frame or template.

Facial Tracker.

Figure 3A:
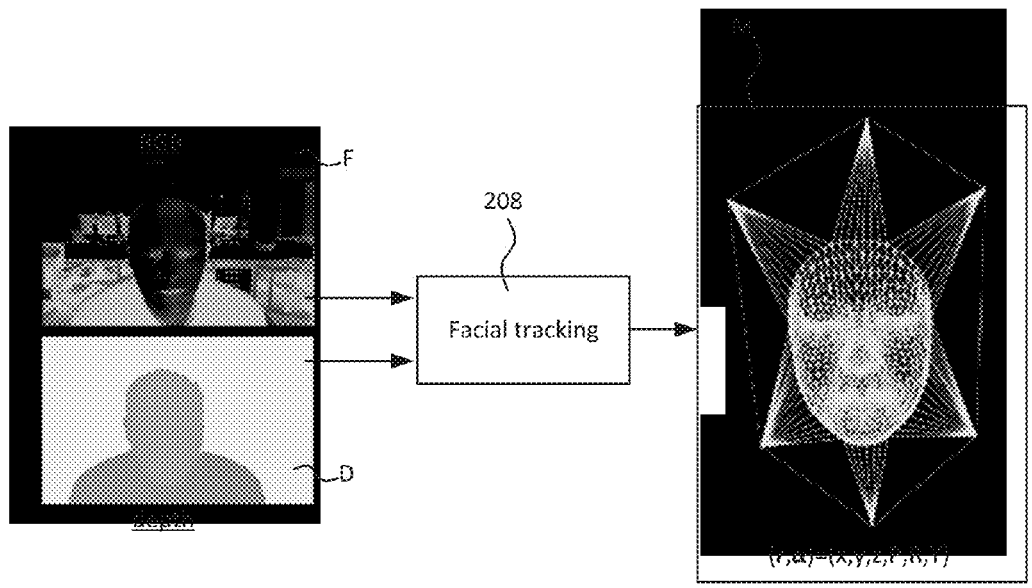
FIG. 3A illustrates functionality of a facial tracker.

FIG. 3A illustrates functionality of the facial tracker 208. The facial tracker receives as inputs the unmodified frames F captured with the camera 106 and (in some embodiments) associated depth data D captured with the depth sensor 126. The depth data D associated with a particular frame F indicates a depth dimension z of elements visible at different (x,y) locations in that frame, so that together the output of the camera 124 and depth sensor 126 provide three-dimensional information about elements within the field of view of the camera 124.

Figure 3B:
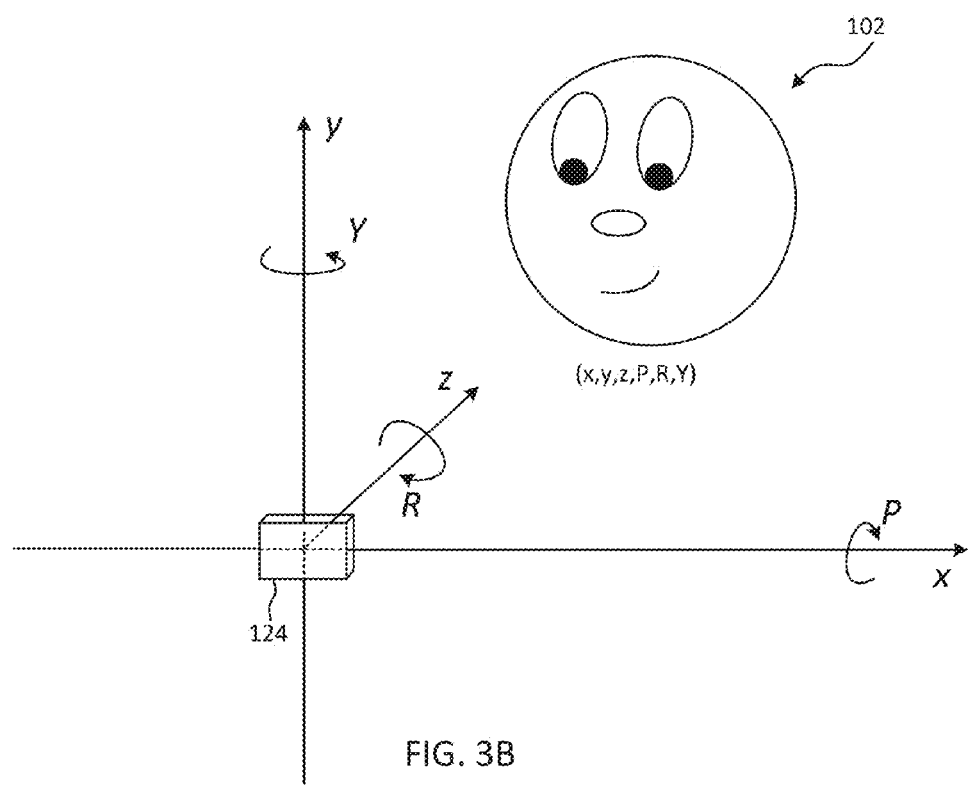
FIG. 3B shows a coordinate system having six degrees of freedom.

The facial tracker 208 is a 3D mesh based face tracker, which gives 6-degree of freedom (DOF) output in 3D space: x, y, z, pitch (P), roll (R), and yaw (Y), which are six independent variables. These six degrees of freedom constitute what is referred to herein as a "pose space". As illustrated in FIG. 3B, the x, y and z coordinates are (Cartesian) spatial coordinates, whereas pitch, roll and yaw are angular coordinates representing rotation about the x, z and y axes respectively. An angular coordinate means a coordinate defining an orientation of the user's face. The coordinate system has an origin which is located at the optical centre of the camera 124. Whilst convenient, this is not essential.

When operating in an active tracking mode, the tracker 208 uses the RGB (i.e. camera output only) or RGB and depth input (i.e. camera and depth sensor outputs) to generate a model M of the user's face. The model M indicates a current orientation and a current location of the user's face, and facial features of the user 102.

Figure 3C:
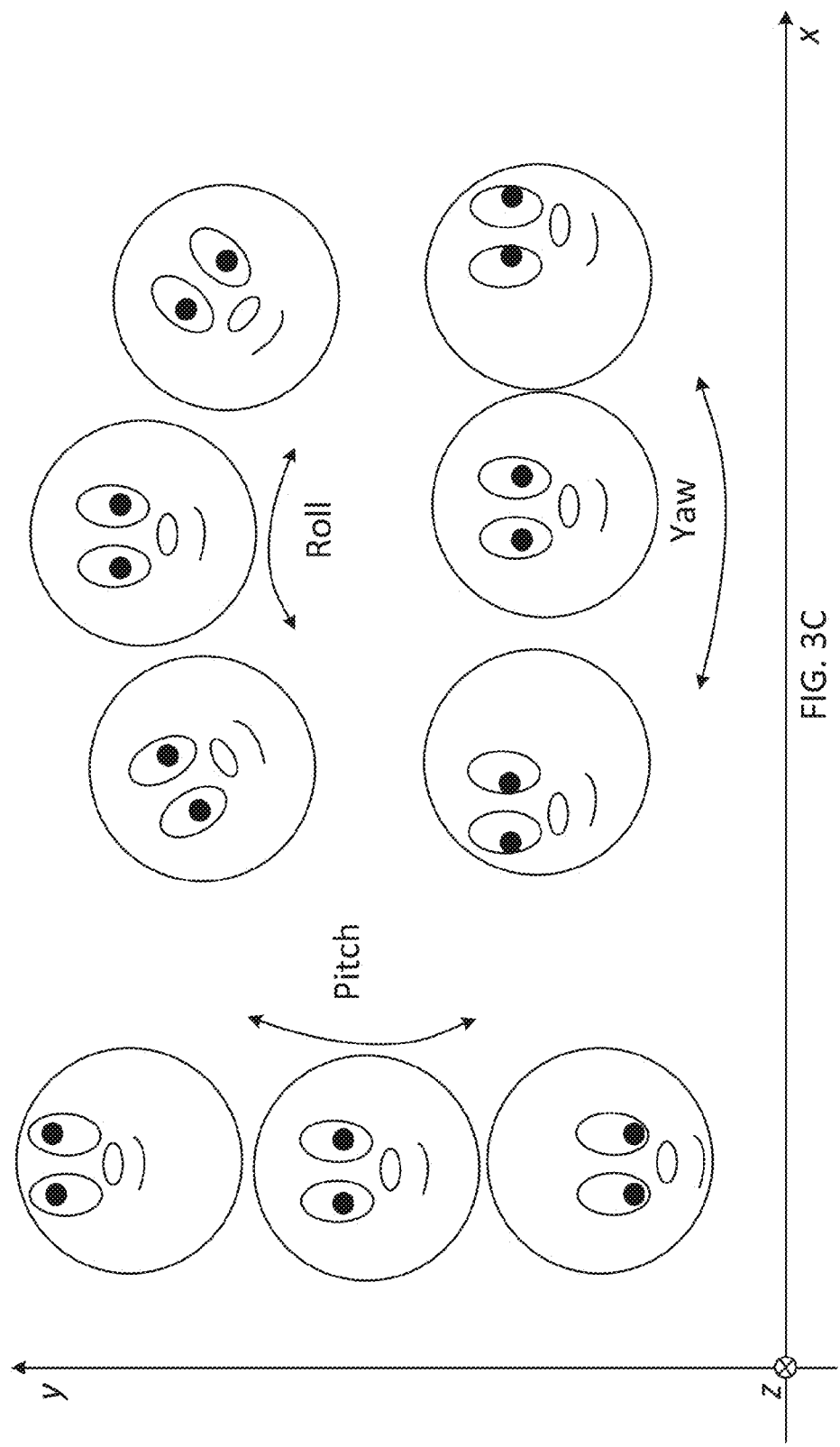
FIG. 3C illustrates how angular coordinates of a user's face may change.

In particular, the user's face has angular coordinates $\alpha = (P, R, Y)$ in this coordinate system (bold typeface denoting vectors), and the model M comprises current values of the angular coordinates $\alpha$. The current values of the angular coordinates $\alpha$ represent the current orientation of the user's face relative to the camera 124. The values change as the user's face exhibits rotational motion about the applicable axis—see FIG. 3C. In this example, $\alpha = (0,0,0)$ represents a neutral pose whereby the user is looking straight ahead in a direction parallel to the z axis. The pitch changes for example as the user nods their head, whereas the yaw changes as the user shakes their head and the roll as they tilt their head in a quizzical manner.

The user's face also has spatial coordinates $r = (x, y, z)$, and the model M also comprises current values of the spatial coordinates in this example. These represent the current location in three dimensional space of the user's face relative to the camera 124. They can for example represent the location of a particular known reference point on or near the user's face, such as a central point of their face or head, or point at or near which a particular facial, cranial or other head feature is located.

The spatial and angular coordinates of the user's face $(r, \alpha) = (x, y, z, P, R, Y)$ constitute what is referred to herein as a pose of the user, the user's current pose being represented by the current values of $(r, \alpha)$.

In this example the model M comprises a 3D mesh representation of some of the user's facial features in the 6-DOF pose space. That is, the model M also describes facial features of the user, for example by defining locations of certain known, recognizable reference points on the user's face and/or contours of their face etc. Thus it is possible to determine from the model M not only the current orientation and location in three dimensional space of the user's face as a whole, but also the current locations and orientations of individual facial features such as their eyes, or specific parts of an eye such as the pupil, iris, sclera (white of the eye), and surrounding skin. In particular, the model M indicates a location or locations corresponding to the user's eyes for use by the eye gaze correction module 202.

Such facial tracking is known and will not be described in detail herein. A suitable facial tracker could for example be implemented with the Kinnect (R) "Face Tracking SDK" (https://msdn.microsoft.com/en-us/library/jj130970.aspx).

Eye Gaze Correction Module.

The eye gaze correction module 202 generates gaze corrected output by blending in pre-recorded imagery (i.e. from the templates Ts) of the users eyes looking directly at the camera.

Figure 4A:
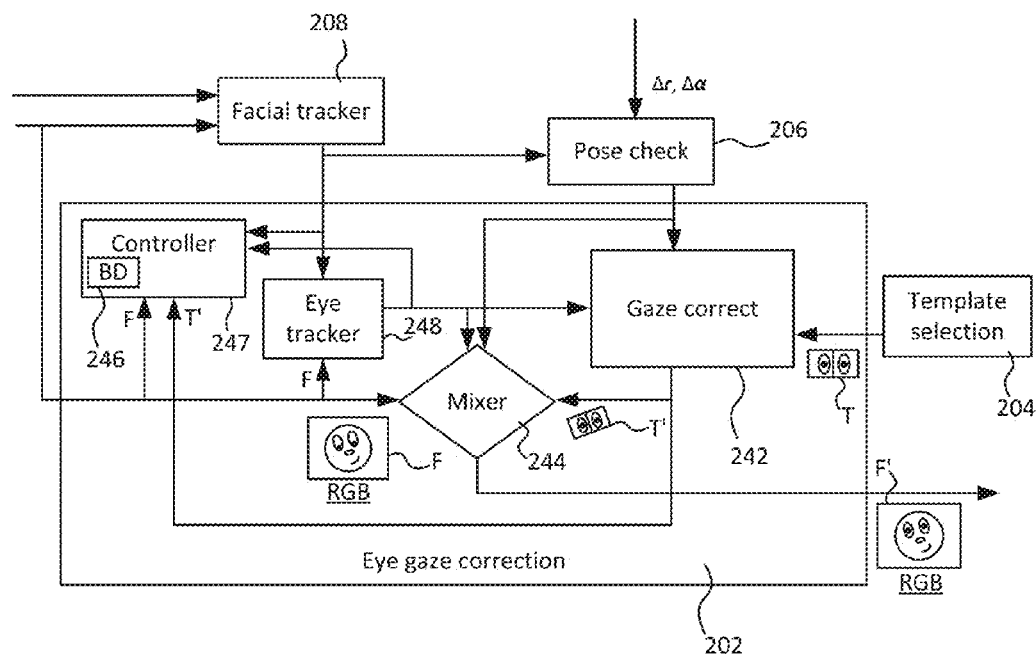
FIG. 4A shows details of an eye gaze correction module.
Figure 4B:
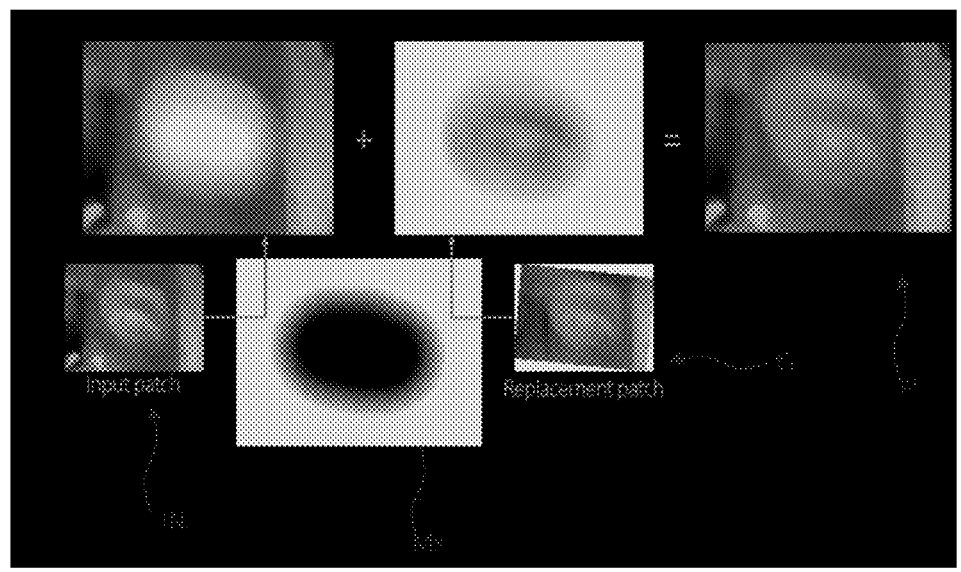
FIG. 4B illustrates an eye gaze correction mechanism.

Further details of the eye gaze correction module 202 are shown in FIG. 4A, and some of its functionality is illustrated graphically in FIG. 4B. As shown, the eye gaze correction module 202 comprises a gaze corrector 242, a mixer 244, a controller 247 and an eye tracker 248.

The gaze corrector 202 receives a pair of templates (template pair) T selected for the current frame by the template selection module 204. A template pair T in the context of the described embodiments means a set of left and right templates $\{t_l, t_r\}$ which can be used to replace the user's left and right eyes respectively, and which in this example comprise images of the user's left and right eyes respectively looking directly at the camera. The left and right templates may come from the same template frame of the template video or they may come from different template frames of the template video. Each template $t_l$, $t_r$ of the pair is transformed so as to match it to the user's current pose indicated by the eye tracker 248 (see below).

The transformed template pair is labelled T'. The transformed left and right templates $t_l$, $t_r$ are also referred to as a replacement patches. For example, the transformation may comprise scaling and/or rotating at least part of the template T to match the current orientation and/or depth z of the user's eyes relative to the camera 124, so that the orientation and size of the user's eyes in the transformed template T' match those of the user's eyes in the to be modified current frame F. Separate, independent transformations are performed for template $t_l$, $t_r$ of the template pair in this example.

The mixer 244 mixes each replacement patch with a corresponding part (input patch) of the current frame F by applying a mixing function Mx to the patches. The mixing function Mx removes any trace of the user's eyes from the current frame F (which generally will not be looking at the camera 124) and replaces them entirely with the corresponding eye images from the input patch (which are looking at the camera 124).

In this example each of the templates Ts comprises an image of an eye of the user and at least a portion of the user's face that surround that eye. The mixing function Mx is a blending function which, in addition to replacing the applicable eye in the current frame F, blends the area surrounding that eye in the template F with a corresponding area in the current frame F, as illustrated in FIG. 4B for the transformed left eye template $t'_1$ for its corresponding input patch $IN_1$ to the left of the user's face. Though not shown explicitly, an equivalent blending is performed for the transformed right eye template $t'_r$ for its corresponding input patch to the right of the user's face. This ensures that the modification is visually seamless. In this manner, the mixer 244 blends the input and replacement patches so as to prevent any visual discontinuity within the current frame.

The model M generated by the facial tracker 208 is used upon initialisation of the eye gaze correction module 202, and in particular by the eye tracker 248 to determine (at least approximate) current locations of the user's eyes. Thereafter, the model co-ordinates are not used to locate the eyes, until a re-initialisation occurs, as using the model co-ordinates would alone led to obvious jittering of the eye over time. Rather, after initialisation, the eyes are tracked separately in the live video over scale, location and rotation by the eye tracker 248 for example based on image recognition. The templates are transformed based on this tracking by the eye tracker 248, to match the current tracked orientation and scale of the user's eyes. The mixing function is also computed based on this tracking by the eye tracker 248 so that the correct part of the frame F, i.e. in which the applicable eye is present, is replaced.

The eye tracker 248 is also constrained to always be within the region of the face tracker eye locations—should a mismatch occur, a failure is assumed to have occurred and the correction is terminated.

Eye tracking and mixing is performed independently per eye—giving greater generalisation of the eye templates.

Note that even when the eye gaze correction module 202 it active, gaze correction may be temporarily halted so as not to modify certain frames. The eye gaze correction module comprises a controller 247. In this example, the controller 247 comprises a blink detector 246 which detects when the user 102 blinks. When a difference between at least one of the replacement patches and its corresponding input patch is large enough, i.e. exceeds a threshold, this triggers a blink detection. This temporarily halts modification of the frames F until the difference drops below the threshold again. In this manner, when a blink by the user 102 is detected in certain frames, these frames are left unmodified so that the blink remains visible in the outgoing video feed. Modification resumes when the end of the blink is detected and the user's eyes are open once more. The controller 246 also temporarily halts the eye gaze correction module 202 if the eye locations indicated by the model M differ too much from the currently tracked eye locations indicated by the eye tracker 248. All such system halts trigger a re-initialisation attempt (see previous paragraph) to resume gaze correction at an appropriate time thereafter.

Selective Activation of Eye Gaze Correction.

Embodiments use the 6 degree of freedom output of the facial feature point tracker 208 to decide on whether or not to correct the user's eye gaze. If and only if the pose of the user's head is within a particular region of 3D space, and oriented towards the camera, then eye gaze correction is performed.

The facial tracker 208 is only operational i.e. it can only function properly (i.e. in the active tracking mode) when the angular coordinates of the user's face are within certain operational limits—once the user's head rotates too much in any one direction the tracker fails, i.e. it is no longer able to operate in the active tracking mode. That is, operational limits are placed on the angular coordinates of the user's face, outside of which the tracker 208 fails. The facial tracker may also fail when the user moves too far away from the camera in the z direction, or too close to the (x,y) limits of its field of view i.e. similar operational limits may be imposed on the spatial coordinates, outside of which the tracker 208 also fails.

More particularly, the tracking module 208 is only able to function properly when each of one or more of the user's pose coordinates $(r, \alpha)=(x, y, z, P, R, Y)$ has a respective current value that is within a respective range of possible values. Should any of those coordinate(s) move out of its respective range of possible values, the tracker fails and the model M therefore becomes unavailable to the other functional modules. It can only re-enter the active tracking mode, so that the model once again becomes available to the other functional modules, when every one of those coordinate(s) has returned to a value within its respective range of possible values.

Figure 5:
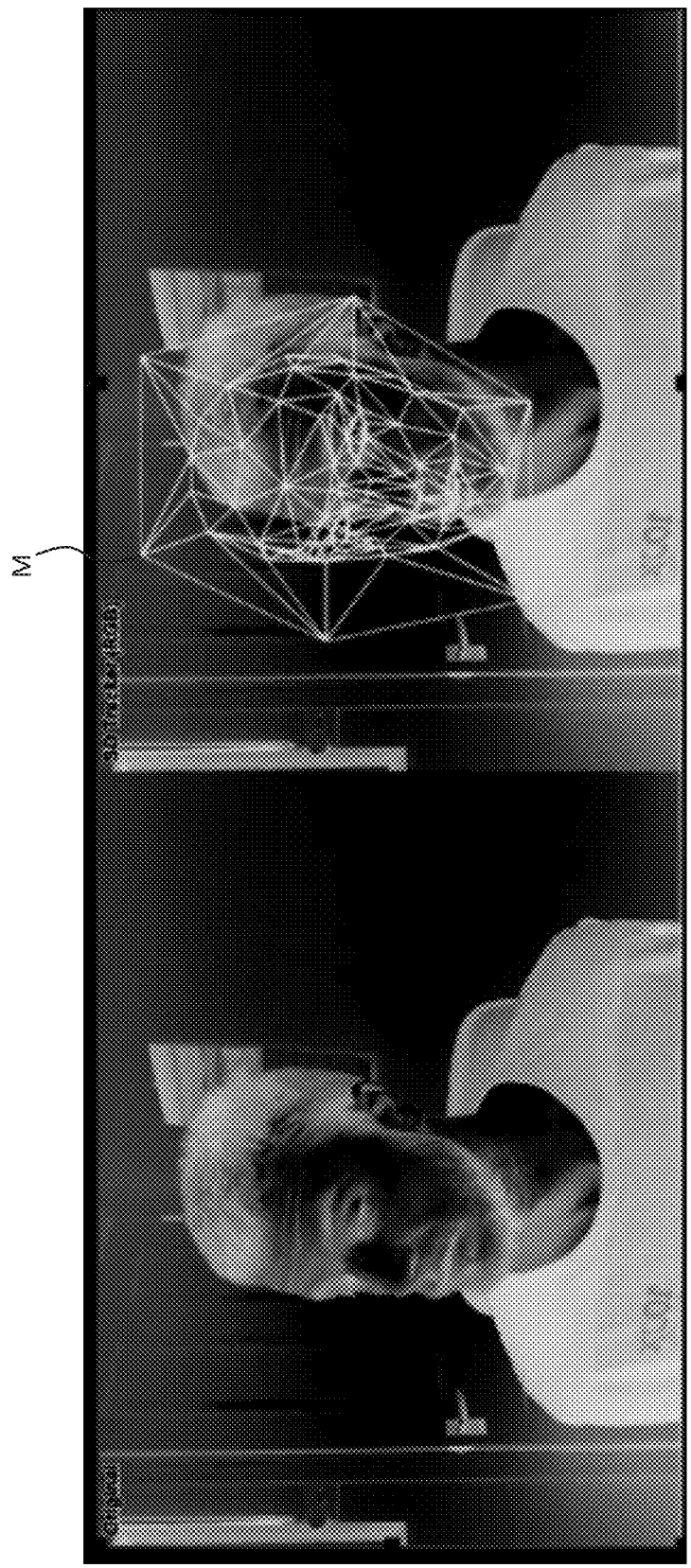
FIG. 5 illustrates behaviour of a facial tracker in an active tracking mode but approaching failure.

Existing eye gaze correction systems disable gaze correction only upon tracker failure. However, there are issues with this approach. Firstly, in a continuously running system a user may not want to always appear to be looking directly at the camera. An example would be if they physically look away with their head. In this situation the face would still be tracked but correcting the eyes to look at the camera would appear unnatural: for example, if the user turns his or her head moderately away from the display 106 to look out of a window then "correcting" his or her eyes to look at the camera would be visually jarring. Secondly, all trackers have a space of poses within which they perform well, for example with a user facing generally towards the camera, or with a ¾ view. However, face trackers tend to perform poorly towards the limits of their operation. FIG. 5 shows a situation where the tracker is approaching failure due to the user facing away from the camera, but is nonetheless still operational. If the tracker output in this situation were to be used as a basis for eye gaze correction, the results would be visually displeasing—for example the user's right eye (from their perspective) is not correctly tracked, which could lead to incorrect placement of the corresponding replacement eye.

Embodiments overcome this by intentionally stopping gaze correction whilst the tracker is still operational i.e. before the tracker 208 fails. That is, gaze correction may, depending on the circumstances, be stopped whilst even when the tracker 208 is still operating in the active tracking mode in contrast to known systems. In particular, eye gaze correction is enabled only when the pose of the head is within a set of valid, pre-defined ranges. This is achieved using the 6-DOF pose $(r, \alpha)=(x, y, z, P, R, Y)$ reported by the facial tracker 208 whenever it is operational. Limits are placed on these parameters relative to the camera and gaze correction is enabled and disabled accordingly.

The primary goal is to enable eye replacement only inside of a space of poses where the user would actually want correction to be performed, i.e. only when they are looking at the display 106 and thus only when their face is oriented towards the camera 124 but they are not looking directly at it. Secondary to this goal is the ability to disable eye replacement before tracker failure—i.e. before the operational limits of the face tracker's pose range are reached. This differs from existing systems which only stop replacement when they no longer know the location of the eyes.

As the user's current pose (r, α) is computed relative to the camera 124 by the tracker 208, it is possible to place limits—denoted Δ herein and in the figures—on these values within which accurate gaze correction can be performed. As long as the tracked pose remains within these limits Δ, the gaze correction module 202 remains active and outputs its result as the new RGB video formed of the modified frames F' (subject to any internal activation/deactivation within the eye gaze correction module 202, e.g. as triggered by blink detection). Conversely, if the tracked pose is not within the defined limits α then original video is supplied for compression and transmission unmodified.

In the embodiments described herein the limits α are in the form of a set of subranges—a respective subrange of values for each of the six coordinates. A user's pose (r, α) is within Δ if and only if every one of the individual coordinates x, y, z, P, R, Y is within its respective subrange. In other embodiments, limits may only be placed on one or some of the coordinates—for example, in some scenarios imposing limits on just one angular coordinate is sufficient. For each of the one or more coordinates on which such restrictions are imposed, the respective subrange is a restricted subrange of the range of possible values that coordinate can take before the tracker 208 fails i.e. the respective subrange is within and narrower than the range of possible values that coordinate can take.

The subranges imposed on the angular coordinate(s) are such as to limit frame modification to when the user's face is oriented towards the camera, and to when the tracker 208 is operating to an acceptable level of accuracy i.e. so that the locations of the eyes as indicated by the tracker 208 do correspond to the actual locations of the eye's to an acceptable level of accuracy. The subranges imposed on the spatial coordinate(s) are such as to limit frame modification to when the user's face is within a restricted spatial region, restricted in the sense that it subtends a solid angle strictly less than the camera's field of view.

The camera and (where applicable) depth sensor outputs are tracked to give a 6-DOF pose. The user's pose (r, α) is compared with A by the pose checker 206 to check whether the pose (r, α) is currently within A. The conclusion of this check is used to enable or disable the gaze correction module 242 and inform the mixer 244. That is, the eye gaze correction module 202 is deactivated by the pose checker 424 whenever the user's pose (r, α) moves out of Δ and reactivated whenever it moves back in, so that the eye gaze correction module is active when and only when the user's pose is within Δ (subject to temporary disabling by the controller 246 e.g. caused by a blink detection, as mentioned). If the pose is valid, i.e. within A, the mixer outputs the gaze corrected RGB video frames (subject to temporary disabling by the controller 246), whereas if the pose is outside of Δ then the mixer outputs the original video. That is, when active, the eye gaze correction 202 module operates as described above to modify live video frames F, and (subject to e.g. blink detection) the modified frames F' are outputted from the gaze correction system 201 as the outgoing video feed. When the gaze correction module 202 is inactive, the output of the gaze correction system 201 is the unmodified video frames F.

Placing limits on the spatial coordinates may also be appropriate—for example if the user moves too far to the edge of the camera's field of view in the xy plane the it may look strange to modify their eyes, particularly if the replacement eye images were captured when the user was near the centre of the camera's field of view i.e. (x,y)≈(0,0). As another example, eye replacement may be unnecessary when the user moves sufficiently far away from the camera in the z direction.

Note that it is also possible to impose such limits on other eye gaze correction algorithms—for example, those which apply a transformation to the live video to effectively "rotate" the user's whole face. Such algorithms are known in the art and will not be described in detail herein.

Limit Setting.

In the embodiments described herein the ranges in the set Δ are computed dynamically by the limit setting module 210 and thus the limits themselves are subject to variation. This is also based on the output of the facial tracker 208. For instance it may be appropriate to adjust the respective range for one or more of the angular coordinates as the user's face moves in the xy plane, as the range of angular coordinate values for which the user is looking at the display 106 will change as their face moves in this way.

In some embodiments the limits α are computed based on local display data as an alternative or in addition. The local display data conveys information about how the far-end video 220 is currently being rendered on the display 106, and may for instance indicate a location on the display 106 at which the far-end video 220 is currently being displayed and/or an area of the display 106 which it is currently occupying. For example, the limits can be set based on the display data so that eye gaze correction is only performed when the user is looking at or towards the far-end video on the display 106, rather than elsewhere on the display. This means that the illusion of eye contact is created for the far-end user 118 only when the near-end user 102 is actually looking at the far-end user 118. This can provide a better correlation between the behaviour of the near-end user 102 and the perception of the far-end user 118, thereby lending even more natural character to the conversation between them.

Alternatively or additionally, the limits may be computed based on a current location of the camera. For example, where the camera and display are integrated in the same device (e.g. smartphone or camera), the position of the camera can be inferred from a detected orientation of the device i.e. the orientation indicates whether the cameras is above, below, leftward or rightward of the display. Further information about the current location of the camera can be inferred for example from one or more physical dimensions of the display.

In other embodiments, fixed limits α may be used instead, for example limits that are set on the assumption that the user's face remains near the centre of the camera's field of view and which do not take into account any specifics of how the far-end video is displayed.

Generally, the specific thresholds may be determined by the performance of the gaze correction algorithm in the specific camera/display setup.

Animated Eyes—Template Selection.

Previous eye gaze correction approaches replace the user's eyes with just a single template between detected blinks, which can lead to an unnatural, staring appearance. In particular, when replacing with only a single static direct gaze patches the user can occasionally appear "uncanny" i.e. having a glazed look about them as, in particular, the eyes lack the high frequency saccading present in real eyes. As indicated above, a saccade is a quick, simultaneous movement of both eyes away and back again.

In embodiments the eyes are replaced instead with a temporal sequence of templates gathered during training time, so that the eyes exhibit animation. That is, a sequence of direct gaze patches, blended temporally to appear lifelike. The template selection module 201 selects different ones of the templates Ts for different frames of at least one continuous interval of the video received from the camera 124, a continuous interval being formed of an unbroken (sub)series of successive frames. For example, the continuous interval may be between two successive blinks or other re-initialization triggering events. In turn, the eye gaze correction module 202 modifies every frame of the continuous interval of the video to replace the user's eyes with those of whichever template has been selected for that frame. Because of the selections intentionally differ throughout the continuous interval, the user's eyes exhibit animation throughout the continuous interval due to the visual variations exhibited between the sorted templates Ts. When the user's eyes are animated in this manner, they appear more natural in the modified video.

During a call users tend to focus on each other's eyes, so it is important that the replacement is unperceivable. In certain embodiments the template selection module 204 selects templates on a per-frame basis (or at least every few e.g. two frames) i.e. a fresh, individual template selection may be performed for every frame (or e.g. every two frames) of the continuous interval so that the selection is updated every frame. In some such embodiments, the template selection may change every frame (or e.g. every two frames) throughout the continuous interval i.e. for every frame (or e.g. every two frames) a template different than that selected for the immediately preceding frame may be selected so that the updated selection always changes the selected frame relative to the last selected template. In other words, changes of template may occur at a rate which substantially matches a frame rate of the video. That is, the eye images may be changed at the frame rate to avoid any perceptual slowness. In other cases, it may be sufficient to change templates less frequently—e.g. every second frame. It is expected that some perceptual slowness would be noticeable when changes of template occur at a rate of about 10 changes per second or less, so that the replacement images remain constant for around 3 frames for to-be modified video having a frame rate of about 30 frames per second. In general, changes of template occur at a rate high enough that the user's eyes exhibit animation i.e. so that there is no perceptual slowness caused by the user being able to perceive replacement eye images individually i.e. above the threshold of human visual perception. This will always be the case where the rate of change of templates substantially matches (or exceeds) the frame rate, though in some cases a lower rate of change may be acceptable depending on the context (for example, depending on video quality)—e.g. whilst 10 or more changes of template per second may be warranted in some circumstances, in others (e.g. where the video quality is poor which may to some extent mask static eyes), a lower rate may be acceptable e.g. every third or even every fourth or fifth frame; or in extreme cases (for instance where the video quality is particularly poor) a template change (only) every second may be even acceptable. In some embodiments, static eye replacement images could be used for a duration of, say, about a second, and the eyes then briefly animated (i.e. over a brief continuous interval) with a replacement saccade video. In embodiments, changes of template may occur up to every frame.

As indicated, the templates Ts are be frames of a direct gaze video in the described embodiments i.e. they constitute an ordered sequence of direct-gaze frames. Frames from this sequence may be selected for replacement in the following manner.

There may only be a short direct gaze video available—e.g. about 1 to 2 seconds worth of frames. For example, for manual capture, the user may only be asked to look at the camera during training for about a second. For this reason, the template frames are looped. Simple looping of the frames would again look visually japing as it would introduce regular, periodic variations. The human visual system is sensitive to such variations and they may thus be perceptible in the outgoing video feed.

Therefore the frames are randomly looped instead by finding transitions which minimise visual differences.

Figure 6:
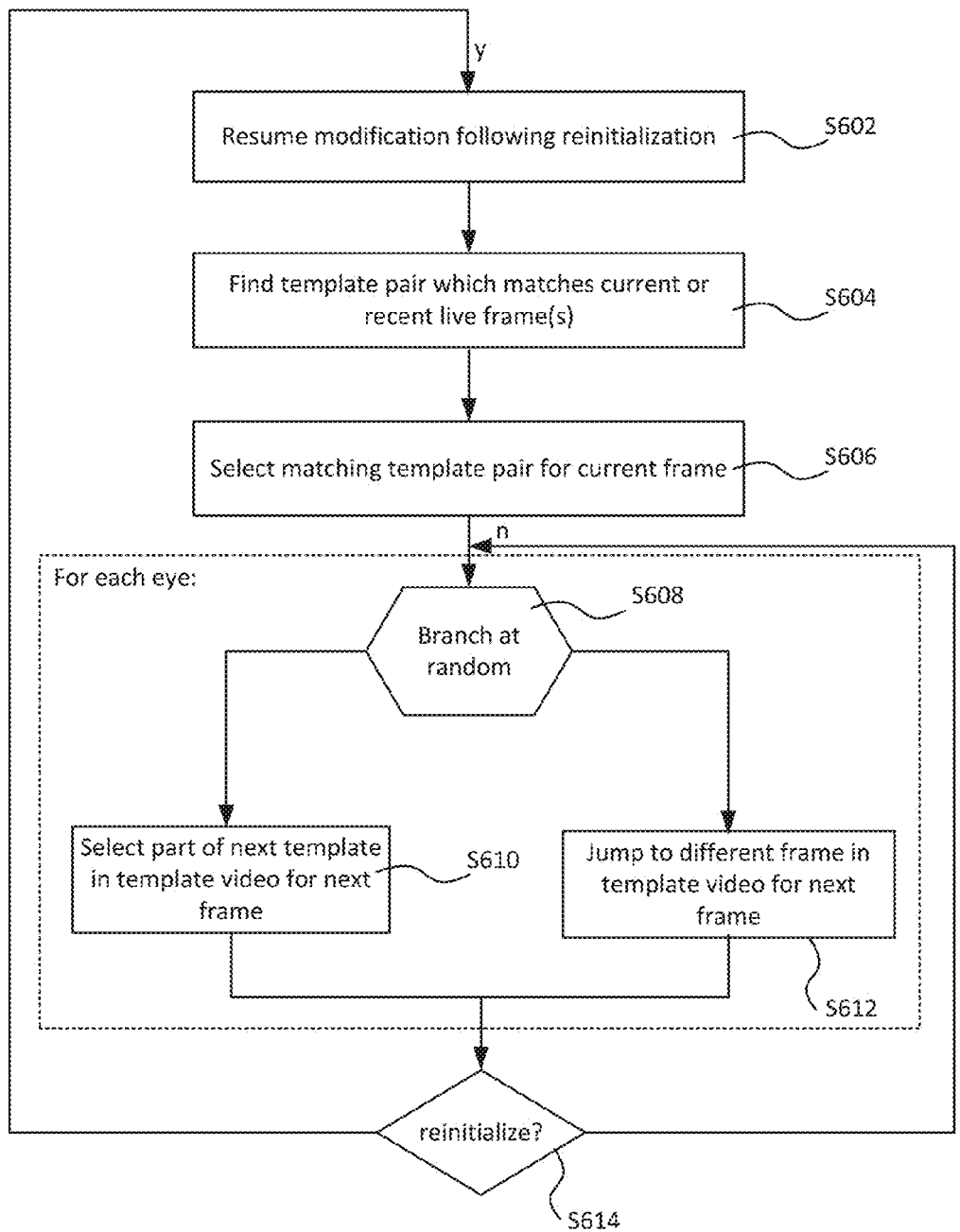
FIG. 6 is a flow chart for a method of dynamic template selection.

FIG. 6 shows a flow chart for a suitable method that can be used to this end. The method resets every time a re-initialisation by the controller 247 occurs, e.g. triggered by a blink by the user in the video being detected. Video modification is resumed following a re-initialisation (S602) At step S604 an initial template pair T={$t_l$, $t_r$} to be used for gaze correction, i.e. the first template pair to be used following the resumption of the video modification, is selected as follows. A number (some or all) of the templates Ts are compared with one or more current and/or recent live frames of the video as received from the camera 124 to find a template pair that matches the current frame, and the matching template pair is selected (S606) by the template selection module 204 to be used for correction of the current frame by the eye gaze correction module 202. Recent frames means within a small number of frames from the current video—e.g. of order 1 or 10. A template pair matching the current frame means a left and a right template that exhibits a high level of visual similarity with their respective corresponding parts of the current and/or recent frame(s) relative to any other template frames that were compared with the current and/or recent frame(s). This ensures a smooth transition back to active gaze correction.

Each of the left and right templates selected at step S602 come from a respective frame of the template video.

At step S608, for each of the left and right eyes, the method branches at random either to step S610 or step S612. If the method branches to step S610 for that eye, the applicable part (i.e. encompassing the right or left eye as applicable) of the next template video frame in the template video is selected for the next live frame i.e. the applicable part of the template frame immediately following the last-selected template frame is selected for the live frame immediately following the last-corrected live frame. However, if the method branches to step S612 for that eye, the applicable part of a template frame other than the next template frame in the template video is selected for the next live frame. This other template frame may be earlier or later than the template frame last used for that eye i.e. this involves a jump forwards or backwards in the template video. This part of the other template frame matches the last-selected template (in the same sense as described above), and is selected on that basis, so that the jump is not jarring. The method loops in this manner until another re-initialization occurs e.g. as triggered by another blink by the user being detected (S614), at which point the method resets to S602. Note that "at random" does not preclude some intelligence in the decision making, provided there is a randomized element. For example, if there is no other template frame that is a close enough match to the last-selected template frame, an intended branch from S608 to S612 may be "overridden" to force the method to jump to S610 instead.

By selecting different template frames for different to-be corrected live frames in this manner, the replacement eyes in the outgoing video always exhibit animation.

Steps S608-S612 constitute a randomized selection procedure, and it is the random element introduced at step S608 that prevents the replacement eyes from exhibiting regular, periodic animation which may be perceptible an unnatural looking to the human visual system. The branching of step S608 can be tuned to adjust the probabilities of jumping to step S614 or step SS16 so as to achieve the most natural effect as part of normal design procedures.

The left and right templates ($t_l$, $t_r$) that constitute the template pair T can be selected from the same or different template frames. They are linked in that, even if they come from different video frames, the distance between the user's pupils in the modified video frames is substantially unaltered. This ensures that the replacement eyes do not appear cross-eyed unintentionally (or if the user is in fact cross eyed, that their natural cross eyed state is preserved) as might otherwise occur e.g. were one of the templates of an eye captured during a saccadic movement, and the other captured during a phase of fixation. In other words, the left and right templates are linked, i.e. they are selected to match one another, so as to substantially maintain the user's natural eye alignment in the modified frames F'. Thus there is some interdependence in the selections at steps S606 and S612, and in the branch of step S608, to ensure that the individual templates of each template pair always substantially match one another.

Template Modification.

The templates Ts used to replace a user's eyes are accessible to the template modification module 212. The pixels in the eye replacement templates Ts have semantic meaning—skin, iris, pupil, sclera etc. —that can be determined for example by image recognition. This allows eye appearance to be modified, for example to change iris colour, making eyes symmetric, perform eye whitening etc. before investing them into the live video. The change could be based on modification data inputted by a user, for example by the user entering one or more modification settings via the UI, automatic, or a combination of both.

This template modification may be performed during a call, when the gaze correction system 201 is running.

Whilst in the template pairs are selected for each eye independently, this is not essential. For example, a single template (e.g. in the form of a signal template video frame) may always be selected for any given to-be modified frame, with both replacement eye images coming from that single frame, so that the pairs are not selected independently for each eye. Further whilst in the above eye gaze correction of the near-end video is performed at the near-end device, eye gaze correction of the near-end video could be implemented at far end device after it has been received from the near-end device via the network and decompressed. Further, whilst use of both a depth sensor and a camera for facial tracking can provide more accurate facial tracking. However, it is still possible to perform acceptably accurate facial tracking using only a camera or only a depth sensor and in practice the results with and without depth, have been found not to be dramatically different. It is also possible to track the user's face using a different camera as an alternative or in addition (e.g. two stereoscopically arranged cameras could provide 3D tracking).

Note that, where it recites herein that a plurality of stored templates each comprises a different image that does not exclude the possibility of some duplicate templates also being stored. That is, the terminology simply means that there are multiple templates at least some of which are different so that different eye images can be selected to effect the desired animation.

According to a first aspect, a user device for correcting an eye gaze of a user comprises: an input configured to receive from a camera video of the user's face; a facial tracking module configured, in an active tracking mode, to track at least one angular coordinate of the user's face and to output a current value of the at least one angular coordinated that is within a range of possible values; and an eye gaze correction module configured to modify frames of the video to correct the eye gaze of the user, whereby the user is perceived to be looking directly at the camera in the modified frames, only when the facial tracking module is in the active tracking mode and the current value is within a restricted subrange of the range of possible values for which the user's face is oriented towards the camera.

In embodiments, the facial tracking module may also be configured to track at least one spatial coordinate of the user's face and to output current values of the tracked coordinates that are each within a respective range of possible values; and the frames may be modified only when the facial tracking module is in the active tracking mode and the current values are each within a respective restricted subrange of the respective range of possible values for which the user's face is oriented towards the camera and within a restricted spatial region. For example, the at least one spatial coordinate may comprise at least two or at least three spatial coordinates of the user's face.

The facial tracking module may be configured to track at least two angular coordinates of the user's face and to output current values of the tracked at least two coordinates that are each within a respective range of possible values; and the frames may be modified only when the tracking module is in the active tracking mode and the current values are each within a respective restricted subrange of the respective range of possible values for which the user's face is oriented towards the camera. For example the at least two angular coordinates may comprise at least three angular coordinates of the user's face The facial tracking module may be configured to track at least one spatial coordinate of the user's face, and the user device may comprise a limit setting module configured to vary the restricted subrange for the at least one angular coordinate based on the tracking of the at least one spatial coordinate.

The user device may comprise a display and a limit setting module configured to vary the restricted subrange for the at least one angular coordinate based on display data indicating a current state of the display. For example, the user device may comprise a network interface configured to receive far-end video of another user which is displayed on the display, and the restricted subrange for the at least one angular coordinate is varied based on a current display parameter of the displaying of the far-end video. E.g. the restricted subrange for the at least one angular coordinate may be varied based on a current location of and/or a current area occupied by the far-end video on the display.

The user device may comprise computer storage holding one or more templates, each comprising an image of an eye of the user looking directly at the camera, wherein the eye gaze is corrected by replacing each of the user's eyes with a respective template.

In some such embodiments, each of the one or more templates may comprise an image of the user's eyes looking directly at the camera and at least portions of the user's face surrounding the eyes, wherein the eye gaze correction module is configured to blend those portions with corresponding portions of the frames.

Alternatively or in addition, the user device may comprise a template modification module configured to modify the templates so as to modify a visual appearance of the eyes. For example the template modification module may be configured to modify the templates to: change an iris colour, correct an asymmetry of the eyes, and/or whiten the eyes.

Alternatively or in addition, every frame of at least one continuous interval of the video may be modified to replace each of the user's eyes with a respective template selected for that frame; the user device may comprise a template selection module configured to select the templates for the continuous interval, different templates being selected for different frames of the continuous interval so that the user's eyes exhibit animation throughout the continuous interval.

The user device may comprise a network interface configured to transmit the modified frames in an outgoing video stream to another user device via a network.

According to a second aspect a method of correcting an eye gaze of a user comprises: receiving from a camera video of the user's face; when a facial tracking module is in an active tracking mode, receiving from the facial tracking module a current value of at least one angular coordinate of the user's face that the facial tracking module is tracking; and modifying frames of the video to correct the eye gaze of the user, whereby the user is perceived to be looking directly at the camera in the modified frames, only when the facial tracking module is in the active tracking mode and the current value is within a restricted subrange of the range of possible values for which the user's face is oriented towards the camera.

The method may comprise step(s) in accordance with any of the user device and/or system functionality disclosed herein.

According to a third aspect, a user device for correcting an eye gaze of a user comprises: an input configured to receive from a camera video of the user's face; computer storage holding a plurality of templates, each comprising a different image of an eye of the user looking directly at the camera; an eye gaze correction module configured to modify every frame of at least one continuous interval of the video to replace each of the user's eyes with that of a respective template selected for that frame, whereby the user is perceived to be looking directly at the camera in the modified frames; and a template selection module configured to select the templates for the continuous interval, wherein different templates are selected for different frames of the continuous interval so that the user's eyes exhibit animation throughout the continuous interval.

In embodiments, each of the plurality of templates may be at least a part of a frame of a template video.

The template selection module may be configured to select the templates using a randomized selection procedure.

As a particular example, the randomized selection procedure may comprise, after an initial template has been selected for use by the eye gaze correction module, selecting a template at random, to be used next by the eye gaze correction module, that is one of the following: at least a part of the next frame in the template video or at least part of a frame in the template video which matches the initial template and which is not the next frame in the template video.

The user device may comprise a blink detection module configured to detect when the user is blinking, and the modification by the eye gaze correction module may be halted for frames of the received video in which the user is detected to be blinking.

In some cases, following a detected blink by the user, at least some of the templates may be compared to a current frame of the received video to select an initial template that matches the current frame of the received video. In some such cases, the templates may be selected according to the randomized selection procedure of the particular example mentioned above thereafter until the user blinks again.

The template selection module may be configured to perform an individual template selection for every frame or every two frames of the at least one continuous interval. For example, the template selection module may be configured to cause a change of template every frame or every two frames.

The user device may comprise a template capture module configured to output to the user a notification that they should look directly at the camera, and to capture the templates when they do so.

As another example, the user device may comprise a template capture module configured to automatically detect when the user is looking directly at the camera and to capture the templates in response.

The user device may comprise the camera or an external interface configured to receive the video from the camera. E.g. the external interface may be a network interface via which the video is received from a network.

The user device may comprise a template modification module configured to modify the templates so as to modify a visual appearance of the eyes e.g. to: change an iris colour, correct an asymmetry of the eyes, and/or whiten the eyes.

The user device may comprise a network interface configured to transmit the modified frames in an outgoing video stream to another user device via a network.

Each of the templates may comprise an image of an eye of the user looking directly at the camera and at least a portion of the user's face surrounding that eye, and the eye gaze correction module may be configured, when that template is selected for a frame, to blend that portion with a corresponding portion of that frame.

The user device may comprise a facial tracking module configured, in an active tracking mode, to track at least one angular coordinate of the user's face and to output a current value of the at least one angular coordinated that is within a range of possible values; the received video may be modified only when the facial tracking module is in the active tracking mode and the current value is within a restricted subrange of the range of possible values for which the user's face is oriented towards the camera.

According to a fourth aspect, a method of correcting an eye gaze of a user comprises: receiving from a camera video of the user's face; accessing a plurality of stored templates, each comprising a different image of an eye of the use looking directly at the camera; and modifying every frame of at least one continuous interval of the video to replace each of the user's eyes with that of a respective template selected for that frame, whereby the user is perceived to be looking directly at the camera in the modified frames, wherein different templates are selected for different frames of the continuous interval so that the user's eyes exhibit animation throughout the continuous interval.

The method may comprise step(s) in accordance with any of the user device and/or system functionality disclosed herein.

According to a fifth aspect, a user device for correcting an eye gaze of a user comprises: an input configured to receive from a camera video of the user's face; computer storage holding one or more templates, each comprising a different image of an eye of the user looking directly at the camera; an eye gaze correction module configured to modify at least some frames of the video to replace each of the user's eyes with that of a respective template, whereby the user is perceived to be looking directly at the camera in the modified frames; and a template modification module configured to modify the one or more templates used for said replacement so as to modify a visual appearance of the user's eyes in the modified frames.

A corresponding computer-implemented method is also disclosed.

Note any features of embodiments of the first and second aspects may also be implemented in embodiments of the third and fourth aspects, and vice versa. The same applies equally to the fifth aspect mutatis mutandis.

According to a sixth aspect, a computer program product for correcting an eye gaze of a user comprising code stored on a computer readable storage medium and configured when run on a computer to implement any of the functionality disclosed herein.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, devices such as the user devices 104, 120 may also include an entity (e.g. software) that causes hardware of the devices to perform operations, e.g., processors functional blocks, and so on. For example, the devices may include a computer-readable medium that may be configured to maintain instructions that cause the devices, and more particularly the operating system and associated hardware of the devices to perform operations. Thus, the instructions function to configure the operating system and associated hardware to perform the operations and in this way result in transformation of the operating system and associated hardware to perform functions. The instructions may be provided by the computer-readable medium to the devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A user device for correcting an eye gaze of a user comprising:
    an input configured to receive from a camera video of the user's face;
    a facial tracking module configured, in an active tracking mode, to track at least one angular coordinate of the user's face and to output a current value of the at least one angular coordinated that is within a range of possible values; and
    an eye gaze correction module configured to modify frames of the video to correct the eye gaze of the user, whereby the user is perceived to be looking directly at the camera in the modified frames responsive to the facial tracking module being in the active tracking mode and the current value is within a restricted subrange of the range of possible values for which the user's face is oriented towards the camera.

2. A user device according to claim 1, wherein the facial tracking module is also configured to track at least one spatial coordinate of the user's face and to output current values of the tracked coordinates that are each within a respective range of possible values; and
    wherein the frames are modified responsive to the facial tracking module being in the active tracking mode and the current values are each within a respective restricted subrange of the respective range of possible values for which the user's face is oriented towards the camera and within a restricted spatial region.

3. A user device according to claim 2 wherein the at least one spatial coordinate comprises at least two or at least three spatial coordinates of the user's face.

4. A user device according to claim 1 wherein the facial tracking module is configured to track at least two angular coordinates of the user's face and to output current values of the tracked at least two coordinates that are each within a respective range of possible values; and
    wherein the frames are modified responsive to the tracking module being in the active tracking mode and the current values are each within a respective restricted subrange of the respective range of possible values for which the user's face is oriented towards the camera.

5. A user device according to claim 4 wherein the at least two angular coordinates comprise at least three angular coordinates of the user's face.

6. A user device according to claim 1 wherein the facial tracking module is configured to track at least one spatial coordinate of the user's face, and the user device comprises a limit setting module configured to vary the restricted subrange for the at least one angular coordinate based on the tracking of the at least one spatial coordinate.

7. A user device according to claim 1 wherein the user device comprises a display and a limit setting module configured to vary the restricted subrange for the at least one angular coordinate based on display data indicating a current state of the display.

8. A user device according to claim 7 comprising a network interface configured to receive far-end video of another user which is displayed on the display, and the restricted subrange for the at least one angular coordinate is varied based on a current display parameter of the displaying of the far-end video.

9. A user device according to claim 8 wherein the restricted subrange for the at least one angular coordinate is varied based on a current location of and/or a current area occupied by the far-end video on the display.

10. A user device according to claim 1 comprising computer storage holding one or more templates, each comprising an image of an eye of the user looking directly at the camera, wherein the eye gaze is corrected by replacing each of the user's eyes with a respective template.

11. A user device according claim 10 wherein each of the one or more templates comprises an image of the user's eyes looking directly at the camera and at least portions of the user's face surrounding the eyes, wherein the eye gaze correction module is configured to blend those portions with corresponding portions of the frames.

12. A user device according to claim 10 comprising a template modification module configured to modify the templates so as to modify a visual appearance of the eyes.

13. A user device according to claim 12 wherein the template modification module is configured to modify the templates to: change an iris colour, correct an asymmetry of the eyes, and/or whiten the eyes.

14. A user device according to claim 1 comprising a network interface configured to transmit the modified frames in an outgoing video stream to another user device via a network.

15. A user device according to claim 10 wherein every frame of at least one continuous interval of the video is modified to replace each of the user's eyes with a respective template selected for that frame;
wherein the user device comprises a template selection module configured to select the templates for the continuous interval, different templates being selected for different frames of the continuous interval so that the user's eyes exhibit animation throughout the continuous interval.

16. A method of correcting an eye gaze of a user comprising:
receiving from a camera video of the user's face;
responsive to a facial tracking module being in an active tracking mode, receiving from the facial tracking module a current value of at least one angular coordinate of the user's face that the facial tracking module is tracking; and
modifying frames of the video to correct the eye gaze of the user, whereby the user is perceived to be looking directly at the camera in the modified frames, responsive to the facial tracking module being in the active tracking mode and the current value is within a restricted subrange of the range of possible values for which the user's face is oriented towards the camera.

17. A method according to claim 16 wherein the facial tracking module is also configured to track at least one spatial coordinate of the user's face and to output current values of the tracked coordinates that are each within a respective range of possible values; and
wherein the frames are modified responsive to the facial tracking module being in the active tracking mode and the current values are each within a respective restricted subrange of the respective range of possible values for which the user's face is oriented towards the camera and within a restricted spatial region.

18. A method according to claim 16 wherein the facial tracking module is configured to track at least two angular coordinates of the user's face and to output current values of the tracked at least two coordinates that are each within a respective range of possible values; and
wherein the frames are modified responsive to the tracking module being in the active tracking mode and the current values are each within a respective restricted subrange of the respective range of possible values for which the user's face is oriented towards the camera.

19. A method according to claim 16 wherein the restricted subrange for the at least one angular coordinate is varied based on display data indicating a current state of a display available to the user.

20. A computer readable storage medium comprising code stored on a computer for correcting an eye gaze of a user configured to:
receive from a camera video of the user's face;
responsive to a facial tracking module being in an active tracking mode, receiving from the facial tracking module a current value of at least one angular coordinate of the user's face that the facial tracking module is tracking; and
modify frames of the video to correct the eye gaze of the user, whereby the user is perceived to be looking directly at the camera in the modified frames, responsive to the facial tracking module being in the active tracking mode and the current value is within a restricted subrange of the range of possible values for which the user's face is oriented towards the camera.

* * * * *